(12) United States Patent
Kang

(10) Patent No.: US 9,633,132 B2
(45) Date of Patent: Apr. 25, 2017

(54) ELECTRONIC DEVICE AND WEB INFORMATION PROVIDING METHOD THEREOF

(75) Inventor: Soo-young Kang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 983 days.

(21) Appl. No.: 12/369,034

(22) Filed: Feb. 11, 2009

(65) Prior Publication Data

US 2010/0031183 A1  Feb. 4, 2010

(30) Foreign Application Priority Data

Aug. 1, 2008 (KR) .................. 10-2008-0075695

(51) Int. Cl.
| | |
|---|---|
| G06F 3/0481 | (2013.01) |
| G06F 3/0484 | (2013.01) |
| G06F 9/44 | (2006.01) |
| G06F 11/36 | (2006.01) |
| G06F 17/30 | (2006.01) |
| H04L 29/06 | (2006.01) |
| H04L 29/08 | (2006.01) |

(52) U.S. Cl.
CPC ...... *G06F 17/30902* (2013.01); *G06F 3/0481* (2013.01); *G06F 3/04817* (2013.01); *G06F 3/04847* (2013.01); *G06F 9/4443* (2013.01); *H04L 29/06* (2013.01); *H04L 29/06095* (2013.01); *H04L 29/0809* (2013.01); *H04L 29/08072* (2013.01); *H04L 29/0872* (2013.01); *H04L 29/08576* (2013.01)

(58) Field of Classification Search
CPC ............... H04L 29/06; H04L 29/08072; H04L 29/0809; H04L 29/06095; H04L 29/08576; G06F 3/0481; G06F 3/04817; G06F 3/04847; G06F 9/4443; G06F 11/3664; G06F 17/3089; G06F 17/30873; G06F 17/30905; G06F 17/30899
USPC .................................. 715/760, 772; 709/227
See application file for complete search history.

(56) References Cited

U.S. PATENT DOCUMENTS

| | | | |
|---|---|---|---|
| 5,896,444 A | 4/1999 | Perlman et al. | |
| 5,905,779 A * | 5/1999 | Steinmetz | 379/93.01 |
| 6,182,122 B1 * | 1/2001 | Berstis | 709/217 |

(Continued)

FOREIGN PATENT DOCUMENTS

| | | |
|---|---|---|
| JP | 2000-311108 | 11/2000 |
| JP | 2002-58082 | 2/2002 |

(Continued)

OTHER PUBLICATIONS

"Multiprocessing," Microsoft Computer Dictionary, Fifth Ed., 2002, p. 447.*

(Continued)

*Primary Examiner* — Eric J Bycer
(74) *Attorney, Agent, or Firm* — Staas & Halsey LLP

(57) ABSTRACT

An electronic device is provided. The electronic device has a web browser that requests web information from a web server, for caching. The electronic device includes: a first controller to initialize the electronic device, when the electronic device is powered on; and a second controller to execute the browser, to store the web information received from the web server, and to control the display a web page using the stored web information.

23 Claims, 8 Drawing Sheets

(56) References Cited

U.S. PATENT DOCUMENTS

| | | | |
|---|---|---|---|
| 6,185,610 B1* | 2/2001 | Nagatomo et al. | 709/219 |
| 6,216,141 B1* | 4/2001 | Straub et al. | 715/234 |
| 6,230,319 B1 | 5/2001 | Britt, Jr. et al. | |
| 6,266,681 B1* | 7/2001 | Guthrie | 715/234 |
| 6,278,773 B1 | 8/2001 | Perlman et al. | |
| 6,292,813 B1* | 9/2001 | Wolfe | 715/205 |
| 6,308,221 B1 | 10/2001 | Perlman et al. | |
| 6,463,531 B1* | 10/2002 | Aguilar et al. | 713/2 |
| 6,526,447 B1 | 2/2003 | Giammaria | 709/232 |
| 6,564,318 B1* | 5/2003 | Gharda et al. | 713/2 |
| 6,584,504 B1* | 6/2003 | Choe | 709/224 |
| 6,584,506 B1 | 6/2003 | Perlman et al. | |
| 6,587,886 B1 | 7/2003 | Perlman et al. | |
| 6,614,890 B2 | 9/2003 | Perlman et al. | |
| 6,785,808 B2* | 8/2004 | Huntington et al. | 713/2 |
| 6,889,251 B1* | 5/2005 | Zhang | 709/220 |
| 7,082,526 B2* | 7/2006 | Chang | 713/2 |
| 7,222,195 B2* | 5/2007 | Das et al. | 709/249 |
| 7,716,633 B1* | 5/2010 | Heath | 717/106 |
| 2002/0048354 A1 | 4/2002 | Perlman et al. | |
| 2002/0066046 A1* | 5/2002 | Liu | 713/300 |
| 2002/0069286 A1* | 6/2002 | Yu | 709/229 |
| 2002/0078095 A1* | 6/2002 | Culham | 707/516 |
| 2002/0143891 A1* | 10/2002 | Huang et al. | 709/217 |
| 2002/0152372 A1* | 10/2002 | Cole et al. | 713/2 |
| 2002/0174232 A1* | 11/2002 | Kikuta et al. | 709/227 |
| 2003/0090510 A1* | 5/2003 | Shuping et al. | 345/738 |
| 2003/0188144 A1* | 10/2003 | Du et al. | 713/1 |
| 2003/0220969 A1* | 11/2003 | Kojima et al. | 709/203 |
| 2004/0093592 A1* | 5/2004 | Rao | 717/168 |
| 2004/0158615 A1* | 8/2004 | Keller et al. | 709/207 |
| 2004/0225876 A1* | 11/2004 | Lam | 713/2 |
| 2005/0132181 A1* | 6/2005 | Kashiwada | 713/100 |
| 2005/0246069 A1 | 11/2005 | Hayashi et al. | |
| 2006/0031667 A1* | 2/2006 | Raghunandan | 713/2 |
| 2006/0056871 A1* | 3/2006 | Kim | 399/81 |
| 2006/0136453 A1* | 6/2006 | Kwan | 707/101 |
| 2006/0195685 A1* | 8/2006 | Kawabe | 713/1 |
| 2007/0011445 A1* | 1/2007 | Waltermann et al. | 713/2 |
| 2007/0083746 A1* | 4/2007 | Fallon et al. | 713/1 |
| 2007/0118728 A1* | 5/2007 | Zhao et al. | 713/1 |
| 2007/0121581 A1* | 5/2007 | Tricaud | 370/352 |
| 2007/0162732 A1* | 7/2007 | Diwan et al. | 713/1 |
| 2007/0220246 A1* | 9/2007 | Powell | G06F 9/45533 713/2 |
| 2008/0002232 A1* | 1/2008 | Mori | 358/401 |
| 2008/0016397 A1* | 1/2008 | Pagan | 714/36 |
| 2008/0134045 A1* | 6/2008 | Fridman et al. | 715/735 |
| 2008/0162666 A1* | 7/2008 | Ebihara et al. | 709/217 |
| 2009/0164613 A1* | 6/2009 | Saillet | 709/223 |
| 2010/0070751 A1* | 3/2010 | Chu et al. | 713/2 |

FOREIGN PATENT DOCUMENTS

| | | |
|---|---|---|
| KR | 10-0274739 | 12/2005 |
| WO | WO 02/09046 A1 | 1/2002 |
| WO | WO 2005034471 A1 * | 4/2005 |

OTHER PUBLICATIONS

O'Reilly et al., "WINDOWS 98 in a Nutshell," 1999, pp. 54-55.*

Larabel, Michael, New ASUS 'Instant-On LINUX' Details, retrieved from http://www.phoronix.com/scan.php?page=news_item&px=NjEwNw on Jul. 29, 2016, originally published on Oct. 8, 2007, by Phoronix, 6 pages.*

"Phoenix Technologies Launches HyperSpace, Foundation for PC 3.0 With Embedded Simplicity," retrieved on Aug. 22, 2016 from Internet archive copy (Nov. 7, 2007), originally pub on Nov. 5, 2007, at http://investor.phoenix.com/en/about+phoenix/investors/news+releases/ReleaseDetail.cfm?ReleaseID=273099 &Year=2007, Phoenix Technologies Press Release, 2 pages.*

Greene, Kate, "Instant Boot-Up," retrieved on Jul. 29, 2016, from https://www.technologyreview.com/s/409399/instant-boot-up/, originally published on Jan. 16, 2008 by Technology Review, 4 pages.*

Begun, Daniel, "Splashtop OS comes to ASUS Laptops," retrieved on Aug. 22, 2016 from http://hothardware.com/news/spashtop-os-comes-to-asus-laptops, originally published on May 29, 2008 by Hot Hardware, 3 pages.*

Communication from the European Patent Office (7 pages) dated Oct. 28, 2009 including European Search Report dated Oct. 12, 2009 and issued in corresponding European Patent Application 09156766.9.

Korean Office Action dated Jul. 30, 2013 from Korean Patent Application No. 10-2008-0075695.

Chinese Office Action dated Mar. 28, 2016 from Chinese Patent Application No. 200910142020.1, 45 pages.

* cited by examiner

ELECTRONIC DEVICE AND WEB INFORMATION PROVIDING METHOD THEREOF

CROSS-REFERENCE TO RELATED APPLICATION

This application claims the benefit of Korean Application No. KR 10-2008-0075695, filed Aug. 1, 2008 in the Korean Intellectual Property Office, the disclosure of which is incorporated herein, by reference.

BACKGROUND OF THE INVENTION

1. Field of the Invention

Aspects of the present invention relate generally to an electronic device including a web browser, and a web information providing method thereof.

2. Description of the Related Art

Recent electronic devices include a web browser to provide various web services to users. After an electronic device is booted up and activated, the web browser is activated to request web information from a web server. The web browser displays web pages using the received web information. In so doing, a considerable amount of time is taken for the electronic device to be initialized and display a web page corresponding to a user's request. As a result, the user is inconvenienced by a long wait time.

SUMMARY OF THE INVENTION

An aspect of the present invention provides an electronic device and a web information providing method thereof, for shortening a web page display time, by receiving web information from a web server during initialization of the electronic device.

According to an aspect of the present invention, there is provided an electronic device having a web browser, which caches web information from a web server. The apparatus includes a first controller to initialize the electronic device when it is powered on; and a second controller to store the web information received from the web server, by executing the web browser during the initialization, and to display a web page using the stored web information, when a web page is requested.

According to an aspect of the present invention, the electronic device may further include a storage. The second controller may control the web browser, so as to receive all or part of the web information from the web sever. The second controller may store the received web information on the storage, as one or more web pages.

According to an aspect of the present invention, the second controller may generate and store mapping information related to an un-received part of the web information, based on the stored web information, to protect against the electronic device being powered off and/or experiencing a connection error with the web server.

According to an aspect of the present invention, when the electronic device is powered on, and/or the connection to the web server is re-established, the second controller may transmit the mapping information to the web server, and then receive and store web information corresponding to the mapping information, from the web server.

According to an aspect of the present invention, the second controller and the first controller may be activated independently.

According to an aspect of the present invention, the web information may be at least one of an image, text, and a document having links to a web page.

According to an aspect of the present invention, the second controller may request web information of the web page and web information of a linked page that is linked to the web page.

According to an aspect of the present invention, the electronic device may further include a display part for displaying the reception status of the web information that is being received from the web server, during the initialization.

According to an aspect of the present invention, the electronic device may further include a display part for displaying a stored web page, during the initialization.

According to an aspect of the present invention, the electronic device may further include: an input part for inputting a web page display command; and a display part for displaying the web page using the stored web information, when the initialization is completed and the web page display command is input.

According to the aspect of the present invention, provided is a web information providing method of an electronic device, which comprises: powering on and initializing the electronic device; requesting web information received from a web server, during the initialization; receiving and storing the web information; and displaying a web page using the stored web information, when a request to display the web page is input.

According to an aspect of the present invention, the receiving and storing of the web information may include receiving all or part of the web information stored in the web server, and storing the received web information, according to web pages.

According to an aspect of the present invention, the web information providing method may further include checking the stored web information, generating and storing mapping information related to an un-received part of the web information, to protect against the electronic device being powered off and/or experiencing a connection error with the web server.

According to an aspect of the present invention, the web information providing method may further include powering off the electronic device, or having a connection error with the web server; and when the electronic device is powered on or the connection to the web server is re-established, transmitting the stored mapping information to the web server, and receiving web information corresponding to the mapping information, from the web server.

According to an aspect of the present invention, the web information may be at least one of images, texts, and a document having a link to the web page.

According to an aspect of the present invention, the web information providing method may further include displaying a reception status of the web information being received from the web server, during the initialization.

According to an aspect of the present invention, the web information providing method may further include displaying a stored web page during the initialization.

According to an aspect of the present invention, the web server may generate and transmit web information relating to a main web page and a linked page that is linked to the main web page, in the form of at least one web page.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
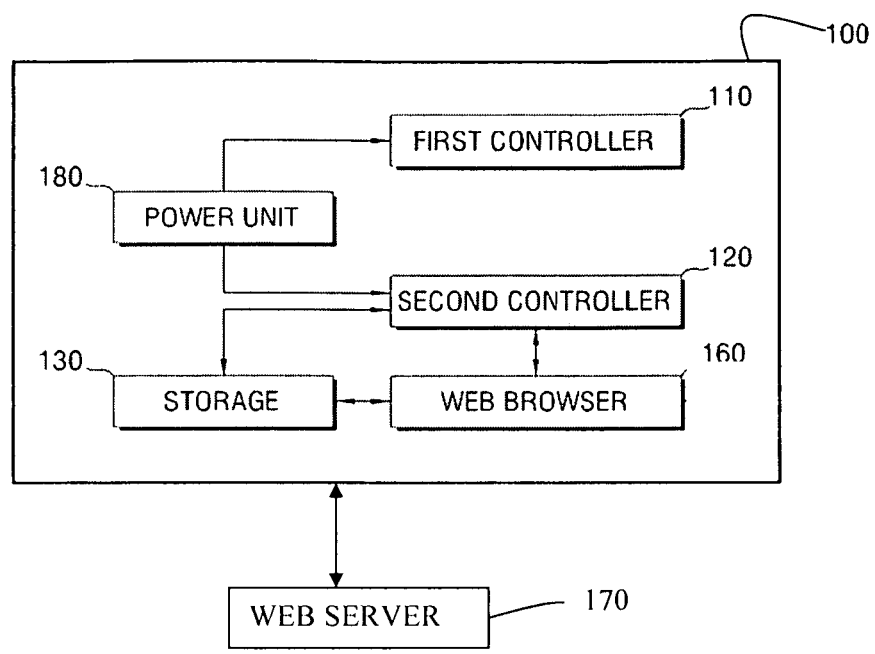
FIG. 1 is a block diagram of an electronic device, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 is a block diagram of an electronic device 100, according to an exemplary embodiment of the present invention. The electronic device 100 includes a first controller 110, a second controller 120, a storage 130, a web browser 160, and a power unit 180. The electronic device 100 can be any electronic device that can communicate with a web server 170. For example, the electronic device 100 can be a laptop computer, a desktop computer, a personal digital assistant, a telephone, a portable media player, or the like.

The power unit 180 provides power to the electronic device 100, when the electronic device is powered on. In more detail, when the image forming apparatus 100 is powered on, the power unit 180 supplies power to the first controller 110 and the second controller 120. When the power is supplied to the electronic device 100, the first controller 110 initializes the electronic device 100, by executing a stored booting program. The power unit 180 can be, for example, a fuel cell, a secondary battery, a plug to an external power source, or the like.

When the power is supplied to the electronic device 100, the second controller 120 executes the web browser 160, independently of the first controller 110, and uses the web browser 160 to request web information from the web server 170. The web server 170 is connected to the electronic device 100, through an interval communication interface (not shown). Such communication can be through wired or wireless protocols.

The second controller 120 can request the web information from the web server 170, using an Internet Protocol (IP) address corresponding to an index screen, which is preset by a user. The IP address is stored in the storage 130. When the power is applied to the second controller 120, the second controller 120 reads the stored IP address and connects to the web server 170. The index screen can be one or more web pages displayable under the control of the electronic device 100. Such display can be on a display device connected to, or integral with, the electronic device 100.

The storage 130 stores the web information received from the web server 170. Herein, the web information can be, for example, images, text, and markup documents including links to web pages (markup language documents). The web information is stored in the storage 130, in the form of displayable web pages. Accordingly, by receiving and storing the web information during the initialization, a web page can be more rapidly displayed to the user. The storage 130 can be a flash memory, a hard drive, or other mechanism that store data, but is not limited thereto. Further, it is understood that the web browser 160 can be stored in the storage 130.

Figure 2:
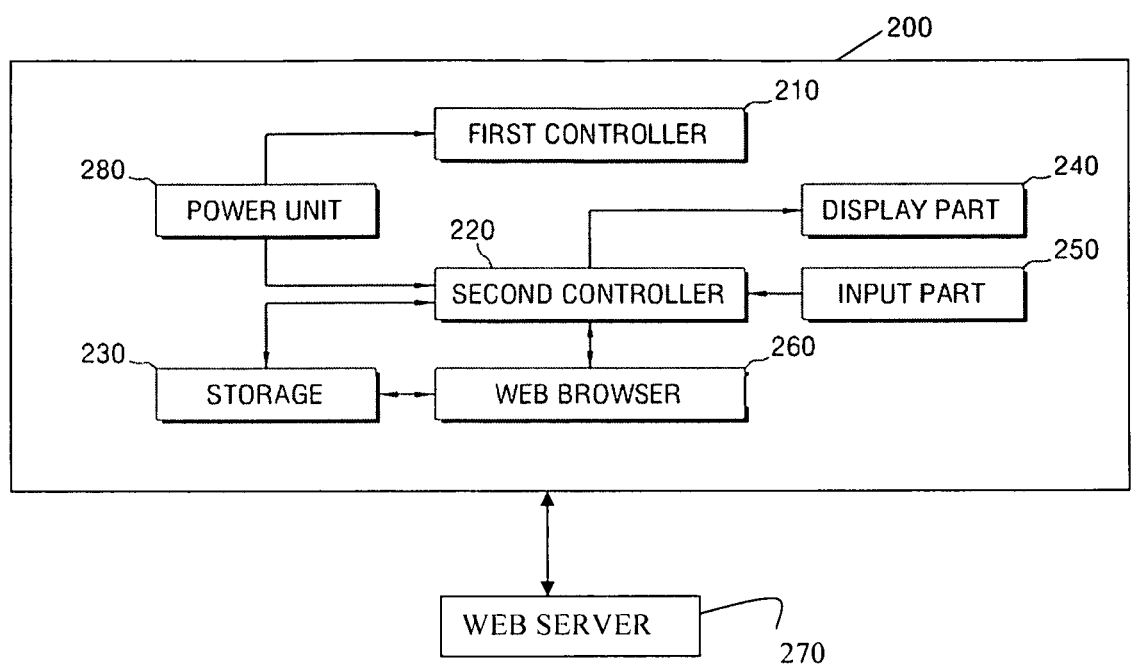
FIG. 2 is a block diagram of an electronic device, according to another exemplary embodiment of the present invention.

FIG. 2 is a block diagram of an electronic device 200, according to another exemplary embodiment of the present invention. The electronic device 200 includes a first controller 210, a second controller 220, a storage 230, a display part 240, an input part 250, a web browser 260, and a power unit 280. The first controller 210, the second controller 220, the storage 230, the power unit 280, the web browser 260, and the web server 270 are similar to those of the electronic device 100 of FIG. 1, and thus, will not be described in detail.

When the electronic device 200 is turned on, the second controller 220 requests selective web information from a web server 270. The web information request can be transmitted together with a signal indicating that the web information is to be stored in advance, during the initialization of the electronic device 200. Alternatively, the web information request can be transmitted together with mapping information, which requests particular web information, based on web information pre-stored in the storage 230. Alternatively, it is possible to program a web browser to request that only particular web information be sorted and stored by the web server 270, based on a set parameter.

To protect against the electronic device 200 being powered off, or experiencing a connection error with the web server 270, the second controller 220 can generate mapping information, by checking the web information stored in the storage 230. The mapping information can be related to an un-received portion of the web information. In other words, the storage 230 classifies and stores the web information as web pages, and stores mapping information corresponding to an un-received portion of the web information, in each web page.

The next time the electronic device 200 is powered on, the second controller 220 sends the mapping information, which is stored to the storage 230, to the web server 270. Hence, by receiving the necessary information from the web server 270, the web browser 260 can be efficiently utilized.

The web server 270 provides various multimedia services, by web pages. The web server 270 can transmit markup language documents, such as documents that include Standard Generalized Markup Language (SGML), HyperText Markup Language (HTML), or Extensible Markup Language (XML), to the web browser 260. The web browser 260 interprets the received markup language documents and displays the corresponding web page(s) linked thereto. Herein, markup language documents may include links created using JavaScript or Cascading Style Sheets (CSS).

The web server 270 can sort and store images, text, and markup language documents having links to the web page, based on their type. The web server 270 can classify common elements of the web pages, or store the corresponding web information by classification, based on the IP address of the web pages.

When receiving the web information request from the web browser 260, during the initialization, the web server 270 can transmit all relevant web information, which includes web information of the main web page and web information of pages linked to the main web page. Alternatively, the web server 270 may transmit information common to every web page, such as a high-capacity image, layer, or web server logo, in addition to web information of the main web page.

When transmitting the web information in response to the request, the web server 270 may compile the web information, so as to transmit it as one page. In the alternative, the web server 270 may classify and generate a plurality of web pages. The web server 270 may include the amount of the transmitted web information in a header, so that the web browser 260 can confirm the reception status of the web information. When receiving the mapping information from the web browser 260, the web server 270 can analyze the mapping information and transmit the requested web information to the web browser 260.

As the first controller 210 performs the initialization, the display part 240 displays the reception status of the web information, under the control of the second controller 220. The reception status of the web information can be represented as a ratio of the received amount of the web information, to the total amount of web information to be transmitted. Alternatively, as the second controller 220 performs the initialization and receives the web information, the display part 240 may display a version of the web page that is retrieved from the storage 230, as an initial screen. The display part 240 can be an LCD, OLED, or other like display and/or a touch screen display, but is not limited thereto.

The input part 250 is a User Interface (UI) for selecting and setting operations supported by the electronic device 200. In this exemplary embodiment of the present invention, the input part 250 can be used to input operations relating to the powering on/off of the electronic device 200, a web page display command, and/or a web service support operation. The UI can be accessed by a touch screen display, a keyboard, buttons, a click wheel, or the like.

When the web page display command is input by a user, through the input part 250, the second controller 220 displays the requested web page, using the web information retrieved from the storage 230. Thus, the web page can be rapidly displayed. The second controller 220 generates the mapping information of the un-received part of the web information, by checking the web information stored in the storage 230. The second controller 220 stores the mapping information in the storage 230.

Figure 3A:
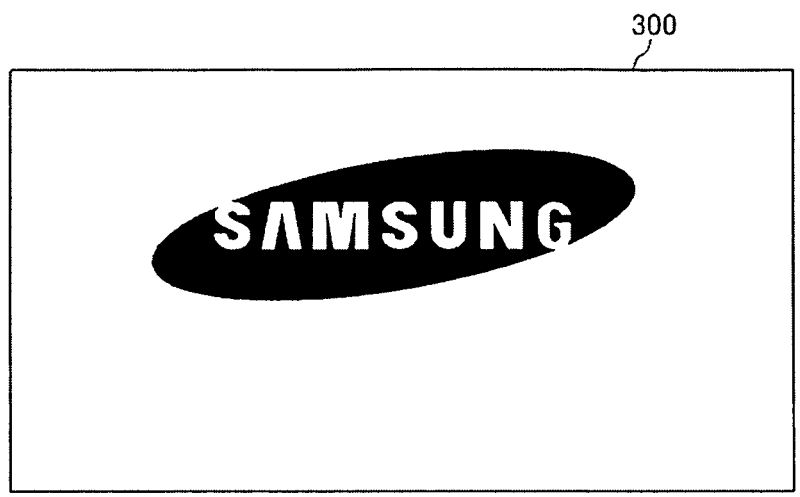
FIGS. 3A through 3E are schematic diagrams of a web information providing method of the electronic device, according to an exemplary embodiment of the present invention.
Figure 3B:
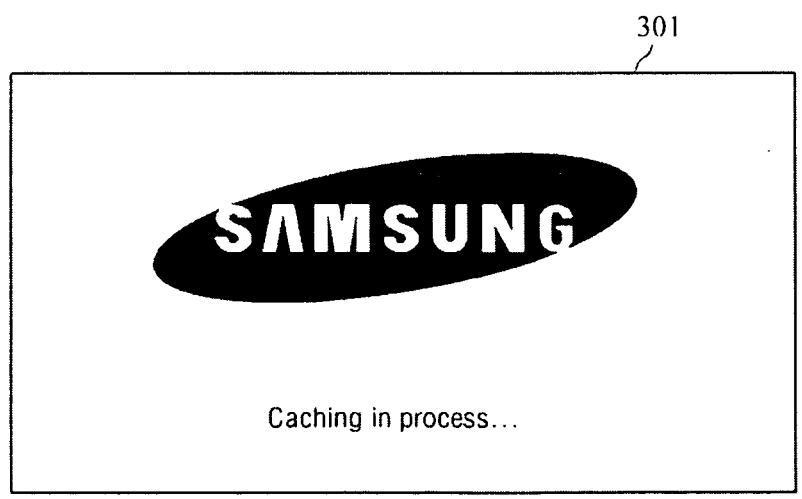
Figure 3C:
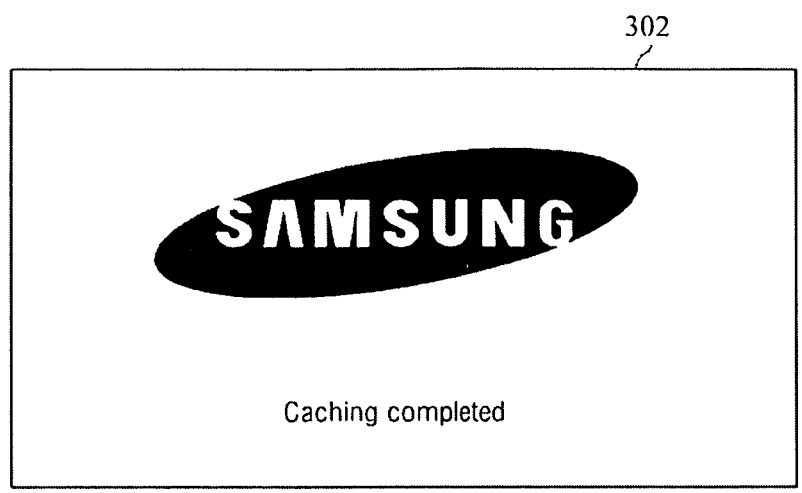

FIGS. 3A through 3E are schematic diagrams of a web information providing method, according to an exemplary embodiment of the present invention, which is described with respect to the electronic device 200 and the web server 270. However, the method can also be applied to the electronic device 100 and the web server 170, or other similar electronic devices/web servers. FIG. 3A depicts a screen shot 300 displayed using the web information. The screen shot 300 shows a stored logo of the electronic device 200, during the initialization thereof. FIGS. 3B and 3C depict screen shots 301, 302 showing the reception status of the web information requested by a web browser 260, from the web server 270, during the initialization. As shown, screen shot 301 indicates caching is being performed using received web information, during the initialization. Screen shot 302 shows that the caching of the web information is complete, while the initialization is continued.

Figure 3D:
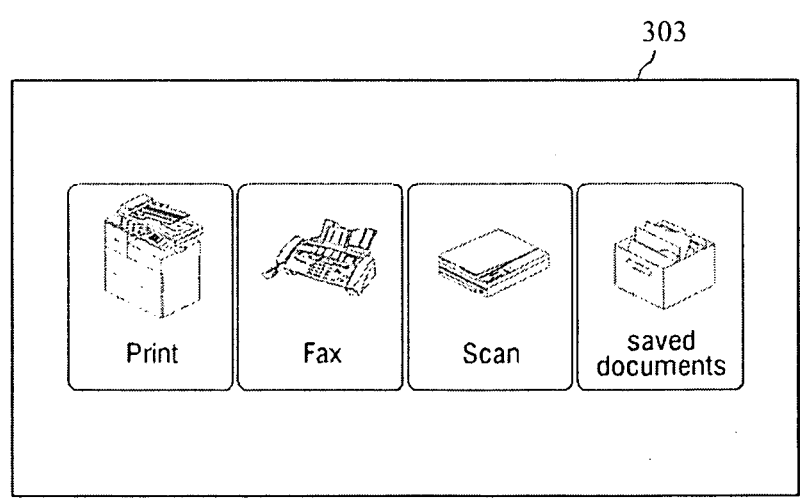

FIG. 3D depicts a screen shot 303 of a main web page, which is displayed by the display part 240 of the electronic device 200, after the web information is cached. Herein, the main web page includes print, fax, scan, and saved documents links. Such display occurs after the initialization is completed, since the startup screen shots 300-302 are no longer displayed.

Figure 3E:
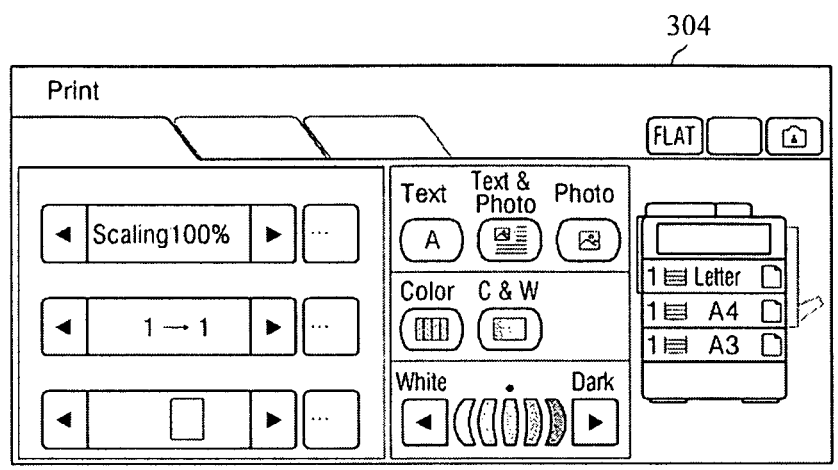

FIG. 3E depicts a screen shot 304 of a linked web page that is linked to the print icon of FIG. 3D. The linked web page is displayed using stored web information of the linked web page.

Figure 4:
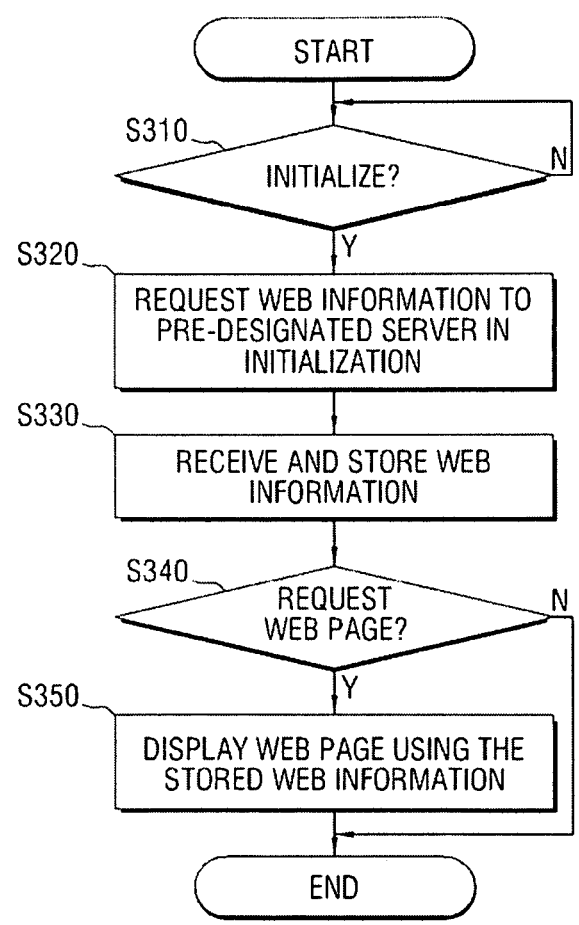
FIG. 4 is a flowchart outlining the web information providing method of the electronic device, according to an exemplary embodiment of the present invention.

FIG. 4 is a flowchart outlining the web information providing method, according to an exemplary embodiment of the present invention, which is described with respect to the electronic device 200 and the web server 270. However, the method can also be applied to the electronic device 100 and the web server 170, or other similar electronic devices/web servers. When power is supplied to the electronic device 200, and the electronic device 200 is initialized, in operation S310, the electronic device 200 actives the web browser 260 during the initialization and requests web information from the pre-designated web server 270, in operation S320.

Herein, the web browser 260 can request the web information from a web server 270, using an IP address corresponding to the index screen pre-set by the user. The web browser 260 can store the IP address and access the web server 270, by reading the stored IP address, when the electronic device 200 is powered off and on.

The electronic device 200 stores the received web information requested during the initialization, in operation S330. Herein, the web information can include images, text, and/or markup language documents including links to web pages. The web information can be stored in the form of displayable web pages. When a user inputs a web page request, in operation S340, the corresponding web page is displayed using the stored web information, in operation S350. While not required in all aspects, the request in operation S340 can be after the first controller 210 completes the initialization of the electronic device 200.

Figure 5:
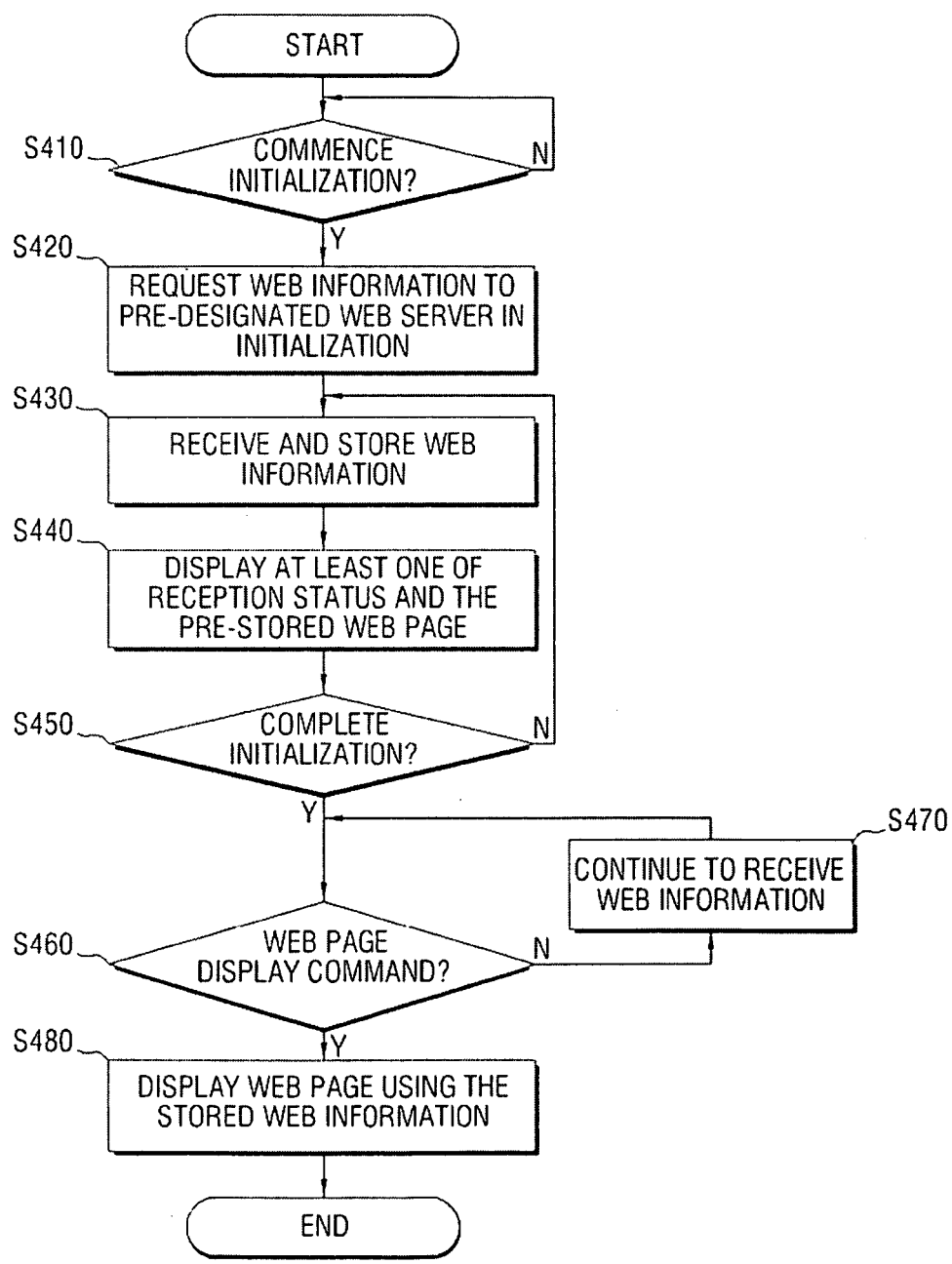
FIG. 5 is a flowchart outlining a web information providing method of the electronic device, according to another exemplary embodiment of the present invention.

FIG. 5 is a flowchart outlining a web information providing method, according to another exemplary embodiment of the present invention, which is described with respect to the electronic device 200 and the web server 270. However, the method can also be applied to the electronic device 100 and the web server 170, or other similar electronic devices/web servers. The initialization of the electronic device 200 is commenced, in operation S410. The web information is requested from the pre-designated web server 270, during the initialization, in operation S420.

Herein, the web information request can be transmitted together with a signal indicating that the web information is to be stored prior to completing the initialization, or together with mapping information that requests particular web information, based on pre-stored web information. The mapping information has been described in detail, with reference to FIG. 2, and shall be omitted here.

Next, the web information received from the web server 270 is stored, in operation S430. The web information can include the information relating to both a main web page and linked web pages, which are linked to the main web page. In the alternative, the web information can be web information corresponding to the mapping information, or other web information transmitted by the web server 270.

Based on the amount of the web information received during the initialization, the electronic device 200 displays the received percentage of web information and/or displays the pre-stored web page, in operation S440. Alternatively, the reception status can indicate whether the web information is currently being received, or that the reception of the web information has been completed, as shown in FIGS. 3B and 3C. Lastly, if no status is to be displayed, operation S440 can be omitted in certain aspects.

If the initialization is completed in operation S450, the electronic device 200 determines whether a user has input a web page display command, in operation S460. When the web page display command has been input, the web page is displayed, using the stored web information, in operation S480. When no web page display command is received in operation S460, the web information is received continuously, in operation S470. If the initialization is still in progress, operations S430 to S450 are repeated.

Figure 6:
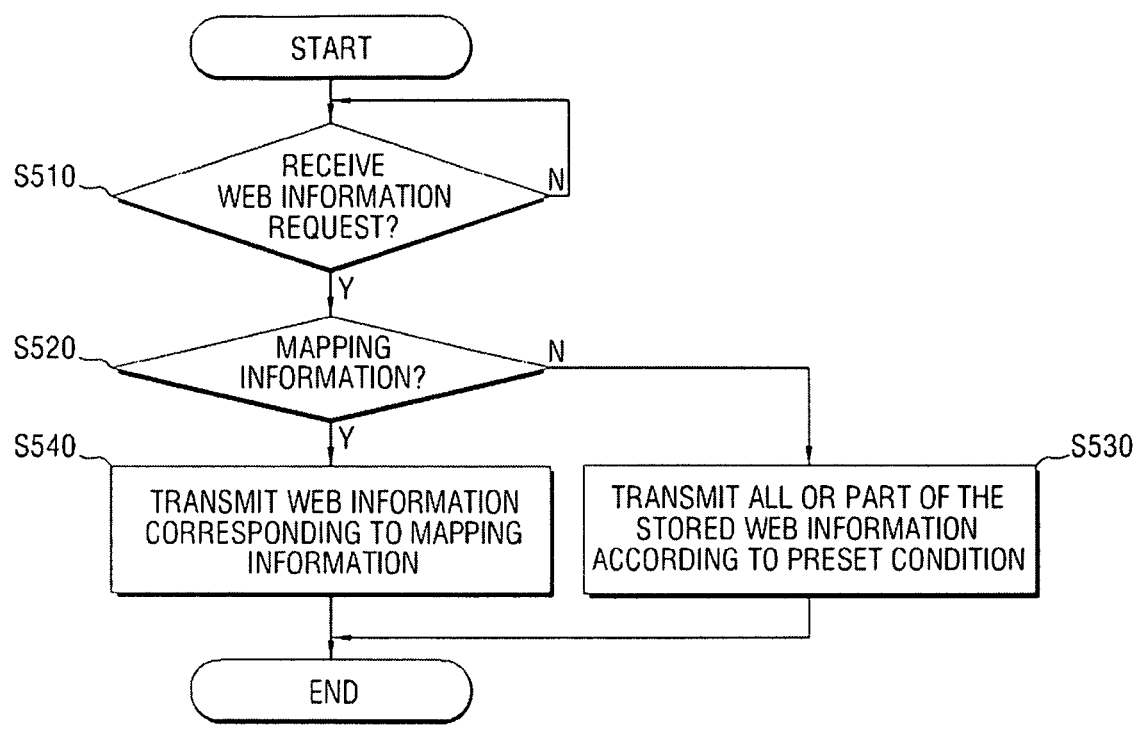
FIG. 6 is a flowchart outlining a web information transmitting method of a web server, according to an exemplary embodiment of the present invention.

FIG. 6 is a flowchart outlining a web information transmitting method, according to an exemplary embodiment of the present invention, which is described with respect to the electronic device 200 and the web server 270. However, the method can also be applied to the electronic device 100 and the web server 170, or other similar electronic devices/web servers. In FIG. 6, the web server 270 provides the web information requested by the web browser 260.

When receiving the web information request signal from the web browser 260, in operation S510, the web server 270 determines whether the received web information request is mapping information, by analyzing the request signal, in operation S520. When the request signal is a pre-storage signal, rather than the mapping information, the web server 270 transmits all of the related web information to the electronic device 200, or a portion of the related web information, according to a predefined condition, in operation S530.

Herein, the predefined condition can take into account the size of the web information and/or the transmission speed thereof. Accordingly, the web server 270 may transmit information commonly displayed in every web page, such as a high-capacity image, layer, or web server logo, and/or the web information of a main web page. In contrast, when receiving the mapping information, in operation S520, the web server 270 interprets the mapping information and transmits the corresponding web information, in operation S540.

When transmitting the web information, the web server 270 may generate the web information as a single web page, or classify and generate a plurality of web pages. The web server 270 may include the size of the transmitted web information in a header, so that the electronic device 200 can confirm the reception status of the web information. Aspects of the present invention can be implemented using one or more computer programs and/or firmware encoded on one or more computer readable media and executed using one or more processors and/or computers.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An electronic device to connect to a web server, the electronic device comprising:
a power supply to provide power to the electronic device;
a web browser to request web information from the web server;
a first controller to receive power from the power supply and to execute initialization of the electronic device by executing a stored booting program, using one or more processors, when the electronic device is powered on and the first controller receives power from the power supply; and
a second controller to receive power from the power supply and, when the electronic device is powered on and the second controller receives power from the power supply the second controller automatically executes the web browser independently of operation of the first controller so that web information of the web page and of a page linked to the web page is requested during the initialization of the electronic device, and the second controller stores the requested web information received from the web server prior to completion of the initialization of the electronic device, and after the initialization of the electronic device is complete the second controller controls the display of a web page using the stored web information.

2. The electronic device of claim 1, further comprising a storage,
wherein the second controller controls the web browser to request and receive all or a portion of the web information from the web server and to store the received web information in the storage, as at least one web page, as the first controller performs the initialization.

3. The electronic device of claim 1, wherein the second controller generates and stores mapping information related to an un-received portion of the web information, based on the stored web information, to protect against the powering off of the electronic device and/or a connection error between the electronic device and the web server.

4. The electronic device of claim 3, wherein, when the electronic device is powered on, or the connection to the web server is re-established, via the web browser, the second controller transmits the mapping information to the web server, via the web browser, and stores web information corresponding to the mapping information, which is received from the web server, as the first controller performs the initialization.

5. The electronic device of claim 1, wherein the first and second controllers operate independently of one another when the electronic device is powered on.

6. The electronic device of claim 1, wherein the web information comprises an image, text, a markup language document having a link to the web page, or combinations thereof.

7. The electronic device of claim 1, further comprising a display part to display a reception status of the requested web information, as the web information is being received from the web server, during the initialization.

8. The electronic device of claim 1, further comprising a display part to display the web page generated using the web information stored during the initialization.

9. The electronic device of claim 1, further comprising:
an input part to input a web page display command; and
a display part to display the web page using the stored web information, when the initialization is completed and the web page display command is input.

10. A web information providing method of an electronic device which comprises a power supply, a first controller, a second controller, and a web browser to request web information from a web server, the method comprising:

powering on the electronic device and supplying power, by the power supply, to the first controller and the second controller;

when the electronic device is powered on and the first controller is supplied power from the power supply, the first controller initializing the electronic device by executing a stored booting program;

when the electronic device is powered on and the second controller is supplied power from the power supply, the second controller automatically executing the web browser, independently of operation of the first controller, so that web information of a web page and of a page linked to the web page is requested from the web server during the initialization of the electronic device, and the second controller receiving and storing, prior to completion of the initialization of the electronic device, the requested web information of the web page and the web information of the page linked to the web page; and displaying the web page using the stored web information after the initialization of the electronic device is complete.

11. The web information providing method of claim 10, wherein the receiving and storing of the web information comprises:

receiving all or a portion of the requested web information from the web server; and storing the received web information as a web page.

12. The web information providing method of claim 10, further comprising:

checking the stored web information to generate and store mapping information relating to an un-received portion of the web information, to protect against the electronic device being powered off and/or a connection error with the web server and the electronic device.

13. The web information providing method of claim 12, further comprising:

powering off the electronic device, or having a connection error between the web server and the electronic device; and when the electronic device is powered on, or the connection to the web server is re-established, receiving web information corresponding to the mapping information, from the web server.

14. The web information providing method of claim 10, wherein the web information comprises an image, text, and a markup language document having a link to the web page, or combinations thereof.

15. The web information providing method of claim 10, further comprising displaying the reception status of the web information being received from the web server, during the initialization.

16. The web information providing method of claim 10, further comprising displaying a stored web page during the initialization.

17. The web information providing method of claim 10, wherein the web server generates and transmits web information relating to a main web page and a web page linked to the main web page, as a single web page.

18. An electronic device to connect to a web server, the electronic device comprising:

a power supply to provide power to the electronic device;

a storage to store web information received from the web server, the web information comprising a web page and a page linked to the web page;

a first controller to receive power from the power supply and to execute initialization of the electronic device by executing a stored booting program, using one or more processors, when the electronic device is powered on and the first controller receives power from the power supply; and a second controller to receive power from the power supply and, when the electronic device is powered on and the second controller receives power from the power supply the second controller automatically executes a web browser, independently of operation of the first controller, sends a request for the web information to the web server during the initialization of the electronic device, and receives and stores the web information requested from the web server in the storage prior to completion of the initialization of the electronic device.

19. The electronic device of claim 18, wherein the second controller generates mapping information related to an un-received portion of the web information, based on the stored web information.

20. The electronic device of claim 19, wherein the second controller uses the web browser to request the un-received portion of the web information from the web server, when the electronic device is initialized.

21. The electronic device of claim 18, wherein during the initialization, the second controller retrieves information on a pre-designated web server, from the storage, and sends the request to the web server, according to the retrieved information on the pre-designated web server.

22. The electronic device of claim 18, wherein the second controller:

determines whether initialization is complete;

determines whether a user has input a web page display command to the electronic device, if the initialization is determined to be completed;

controls the display to display the web page, using the stored web information, if the web page display command has been input;

continues to receive web information through the web browser and store the web information in the storage, if the web page command is not received; and continues to receive web information through the web browser and store the web information in the storage, if the initialization is determined to not be completed.

23. A method of electronic device to connect to a web server, the electronic device comprising:

a web browser to request web information from the web server, the web information comprising a web page and a page linked to the web page;

a first controller comprising one or more processors used to execute initialization of the electronic device by executing a stored booting program, upon initial application of power to the electronic device and supply of power to the first controller;

a second controller, different from the first controller, comprising one or more processors, used to automatically execute the web browser independently of operation of the first controller upon initial application of power to the electronic device and supply of power to the second controller, so that the web information is requested during the initialization of the electronic device and so that the requested web information received from the web server is stored prior to completion of the initialization of the electronic device, and after the initialization of the electronic device is complete the second controller controls the display of a web page using the stored web information, wherein the first and second controllers operate independently of one another when power is initially applied to the electronic device.

\* \* \* \* \*